(12) United States Patent  
Edwards, III (10) Patent No.: US 8,578,542 B2  
(45) Date of Patent: Nov. 12, 2013

(54) PORTABLE VEHICLE ROOF SNOW AND ICE REMOVAL APPARATUS

(76) Inventor: Earl E. Edwards, III, Wind Gap, PA (US)

(*) Notice: Subject to any disclaimer, the term of this patent is extended or adjusted under 35 U.S.C. 154(b) by 314 days.

(21) Appl. No.: 12/931,696

(22) Filed: Feb. 8, 2011

(65) Prior Publication Data

US 2012/0198636 A1    Aug. 9, 2012

(51) Int. Cl.
*B60S 3/04*    (2006.01)

(52) U.S. Cl.
USPC ............................ 15/97.3; 15/DIG. 2; 37/196

(58) Field of Classification Search
USPC ............ 15/97.3, 93.1, 3, DIG. 2; 37/196, 219
See application file for complete search history.

(56) References Cited

U.S. PATENT DOCUMENTS

| 3,772,723 | A | * | 11/1973 | Krimm | 15/53.3 |
| 5,802,654 | A | | 9/1998 | Yeaglin | |
| 5,989,356 | A | * | 11/1999 | Candeletti | 134/6 |
| 6,453,500 | B1 | | 9/2002 | Schmitt | |
| 6,654,978 | B2 | * | 12/2003 | Bouchard | 15/3 |
| 8,277,647 | B2 | * | 10/2012 | Rice et al. | 210/171 |
| 2002/0166265 | A1 | | 11/2002 | Shaw | |
| 2007/0074357 | A1 | | 4/2007 | Reed | |
| 2009/0282630 | A1 | | 11/2009 | Reed | |
| 2009/0282708 | A1 | | 11/2009 | Reed | |
| 2012/0233793 | A1 | * | 9/2012 | Quinn | 15/97.3 |

* cited by examiner

*Primary Examiner* — Laura C Guidotti
(74) *Attorney, Agent, or Firm* — Sanford J. Piltch (57) ABSTRACT

An improved apparatus for removing snow and ice from the roof top of a truck, trailer, bus or similar vehicle is mounted atop a converted flatbed trailer for ease of relocation from one site to another for use. The addition of a height adjustable scraper or plow blade that is operator controlled to remain in contact with the roof of the vehicle being cleaned is provided with a self-contained front-to-back and side-to-side stabilization mechanism to prevent damage to the tops of vehicles by gouging or tearing the roof top.

5 Claims, 5 Drawing Sheets

PORTABLE VEHICLE ROOF SNOW AND ICE REMOVAL APPARATUS

BACKGROUND OF THE INVENTION

The invention generally resides in the field of large vehicles having extended flat roofs, such as trucks, trailers and buses, for clearing of snow and ice deposits therefrom. The roof tops of trailers, vans, trucks, buses and the like represent a relatively large area. In cold climates, owners of such vehicles face the challenge of removing snow and ice from roof tops of such vehicles prior to operating them on roadways. The snow and ice removal operation is usually performed manually by several workers shoveling from atop the vehicle roof tops. The operation is both tedious and time consuming. It is associated with relatively high maintenance costs particularly during significant snowfalls occurring in a given period with a large fleet of vehicles that must be cleaned. The cleaning operation can be time consuming which may lead to delays in the delivery of goods with the associated potential of loss of business.

The removal of snow and ice from the roof tops of vehicles is not only costly but also potentially dangerous for the individuals who must stand on the slippery roof tops of such vehicles which can reach a height of twelve to fifteen feet. Further, in circumstances where the snow and/or ice is not removed from the roof tops of such vehicles, a slab of snow or ice may fly off the vehicle while being operated and strike another vehicle following behind. If such an incident occurs, the driver of the vehicle following may be startled to the point of losing control of his or her vehicle. The slab of snow or ice may also impact a windshield with such force so as to break it leading to disastrous consequences. Consequently, some regional laws recognize that snow and ice atop vehicles pose a threat to the public safety and require that snow and ice be removed from the vehicle before it is driven on a public road imposing large penalties on offenders.

The need for alternative methods of removing snow and ice from a vehicle's roof top has been recognized in a number of earlier publications. For example, some devices include rollers for scraping the snow from the vehicle roof with a height adjustment by use of a hydraulic circuit or by having the vehicle move under a snow plow arrangement with the entire structure secured to the ground. Other devices disclose snow removal systems which dispense de-icer fluid to melt the snow combined with a cross-bar that can be raised and lowered.

For example, U.S. Pat. No. 6,453,500 [Schmitt] entitled "Vehicle Roof Snow Removal System" discloses a blade system riding atop the roof of a trailer where the blade is vertically adjustable using pulley systems in each of two towers straddling the vehicle path. In addition, the blade has a "squeegee" along its lower edge to protect the trailer roof from gouging, etc. Schmitt describes a sensor to detect the vehicle height and a control unit to lower the scraper blade when a vehicle is detected. Schmitt also describes a manual handle for raising and lowering the scraper blade through a series of pulleys and cables. However, Schmitt does not suggest a hydraulically positioned vehicle roof surface plow system for maintaining maximum contact with the roof surface as the vehicle is moved through the cleaning apparatus or structural members to provide a more stable plow blade and control surfaces for throwing snow outward and downward from the plow blade.

A second example of a vehicle roof plow device is described in U.S. Pat. No. 5,802,654 [Yeaglin] entitled "Snow and Ice Remover for Vehicle Roofs" which describes a vertically adjustable plow bar suspended from a winch located on a bridge spanning between two towers that uses each of the towers as a guide for raising and lowering the device. There is a protective strip along the entire horizontal length of the plow blade and the reinforcing bar between the towers. Yeaglin, again, does not disclose a hydraulically adjustable vehicle roofline follower system or control surfaces for throwing the snow and ice outward and downward.

There are three U.S. Patent Application Publications describing substantially similar vehicle roof clearing concepts. U.S. Patent Application Publication Nos. US 2007/0074357 A1, US 2009/0282630 A1 and US 2009/0282708 A1 [Reed] all entitled "Truck Terminal Snow Screed Portable Structure" describe a rearward lateral reinforcing structure of the plow blade. Reed also states that the apparatus is relocatable utilizing a pair of lift trucks operating in tandem to move and relocate the apparatus. The only adjustable element is the vertical height of the blade without any rooftop following apparatus. Also, U.S. Patent Application Publication No. US 2002/0166265 A1 entitled "Truck, Trailer and Bus Plow" [Shaw] discloses a device similar to the Reed apparatus, but does not disclose a portability feature by use of separate equipment like the Reed apparatus.

There are several deficiencies found in the various apparatus existing in the field. First, these apparatus do not contain elements to raise or lower tower height to primarily make the snow clearing apparatus truly portable with a lower vertical clearance, and secondarily, to accommodate vehicles of different heights, nor do they suggest it. Next, these existing devices do not describe or suggest the use of a hydraulically positioned vehicle roof surface plow system for maintaining contact with the roof top surface for better snow clearing performance. Finally, these prior devices do not describe or suggest the use of a plurality of structural instrumentalities to provide a more stable plow blade to prevent roof gouging or alignment mishaps.

Therefore, it is an object of the present invention to provide an improved device for removing snow and ice from the roof top of vehicles which is portable. It is another object of the present invention to provide a device for removing snow and ice from the roof top of vehicles which has a height adjustable scraper or plow blade.

Still another object of the present invention is to provide a device for removing snow and ice from the roof top of vehicles which has wheels that greatly adds to the alignment and stability of the device, preventing damage to the top of the vehicle, and has the ability to bounce on the roof top in order to break up compacted snow or ice for easy removal. Yet another object of the present invention is to provide a snow and ice removing device from the roof top of vehicles that has a gross adjustment capability for the tower height.

Further still, another object of the present invention is to provide a device for removing snow and ice from the roof top of vehicles which uses a hydraulic system for maintaining the plow blade against the roof top surface while at the same time pushing off the snow from the roof top. Another object of the present invention is to provide a device for removing snow and ice from the roof top of vehicles that has a rolled rubber end on the plow blade that is sufficiently rigid to assist in the removal of the snow and ice, yet does not present a sharp surface that could damage the roof top of a vehicle.

Accordingly, there exists a need for an improved portable apparatus for removing snow and ice from the roof top of vehicles that is vertically adjustable to accommodate differing height vehicles and controlled to follow the roofline of a vehicle by hydraulics such that the blade remains in substantial contact with the roof and has control surfaces for throwing snow outward and downward from the plow blade.

Other objects will appear hereinafter.

SUMMARY OF THE INVENTION

The present invention may be described as a vertical height adjustable plow-like blade assembly for scraping the tops of land mobile vehicles to remove deposits of snow and ice. The blade assembly is positioned along a bridge between two towers and is hydraulically adjustable in the vertical direction for close height adjustment to a point proximate the roof of the vehicle.

A relocatable vehicle roof top snow and ice removal apparatus is described including a converted flatbed trailer base having front and rear sections and a space between them to accommodate the passage of a vehicle. Mounted to the trailer base sections are a pair of towers each having a top and bottom portion with the towers being joined together at their respective top portions by a bridge spanning the space to accommodate the vehicle passage. A scraper blade assembly is mounted at the midpoint of the bridge and is operatively controlled for raising and lowering the blade assembly to engage and remain engaged with the roof surface of the vehicle to be cleaned of snow and ice while maintaining a downward force against the roof of the vehicle. Finally, a self-contained stabilization means within the scraper blade assembly is described for retaining the scraper blade assembly in parallel relationship to the surface of the vehicle roof in order to prevent damage to the vehicle roof.

Additionally, a plurality of stabilizing jacks can be located along the periphery of the front and rear trailer sections at opposite sides of said towers and at the rear of the rear trailer section to maintain the perpendicularity of the apparatus to the roof top of the vehicle. Stabilizer bracing members for maintaining the perpendicularity of said towers to the trailer sections beds can be used extending between the flat bed of each of the front and rear sections of the trailer to the near side of the bottom portion of the adjacent tower. Also, a trailer section locking bar connecting said front and rear trailer sections for maintaining the spacing between the trailer sections the same as between the towers is required for use in the relocating of the apparatus. Finally, a hydraulic controller may be used for raising and lowering the blade assembly in the vertical direction for close height adjustment to a point proximate the roof of a vehicle to be cleaned of snow and ice.

The pusher blade is angled symmetrically from the centerline of the point of application in the range between 30 and 45 degrees outward with each blade segment having a sufficient length to extend over the sidewall of the vehicle. The blade portions are maintained at their angular orientation by a position locking bar connecting the two portions at a position to the rear of the blade portions. The blade rides atop a replaceable rubber-like scraper that permits close contact with the vehicle roof without damage. The rolled rubber end on the plow blade of the present invention is sufficiently rigid to remove the snow and ice but gentle enough not to damage the roof top of a vehicle.

The blade is maintained in a downward forced position by a hydraulic arm extending rearward from the bridge between the towers that is connected to the conjoined point of the two blade portions. Additionally, a flat planar portion is affixed to the top of the blade at its forward portion to force plowed-up material outward and downward from the vehicle roof.

The scraper or plow blade includes a series of spaced apart wheels that support the plow above the vehicle roof top a predetermined distance and add stability to the device. Structured in this manner the plow blade assembly does not damage the top of the vehicle and has the ability to bounce on the roof top using the wheels as a stop in order to break up compacted snow or ice for easier removal.

Moreover, the present invention uses a hydraulic system for holding down the plow blade while at the same time pushing off the snow from the roof top by the use of fluid pressure which enables it to clear all snow from the roof top of a vehicle without lifting up. The hydraulic system controls the blade so that it may follow the roofline of a vehicle and remain in substantial contact with the roof.

These together with other objects of the present invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description in which there are illustrated preferred embodiments of the invention.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figures 1, 2:
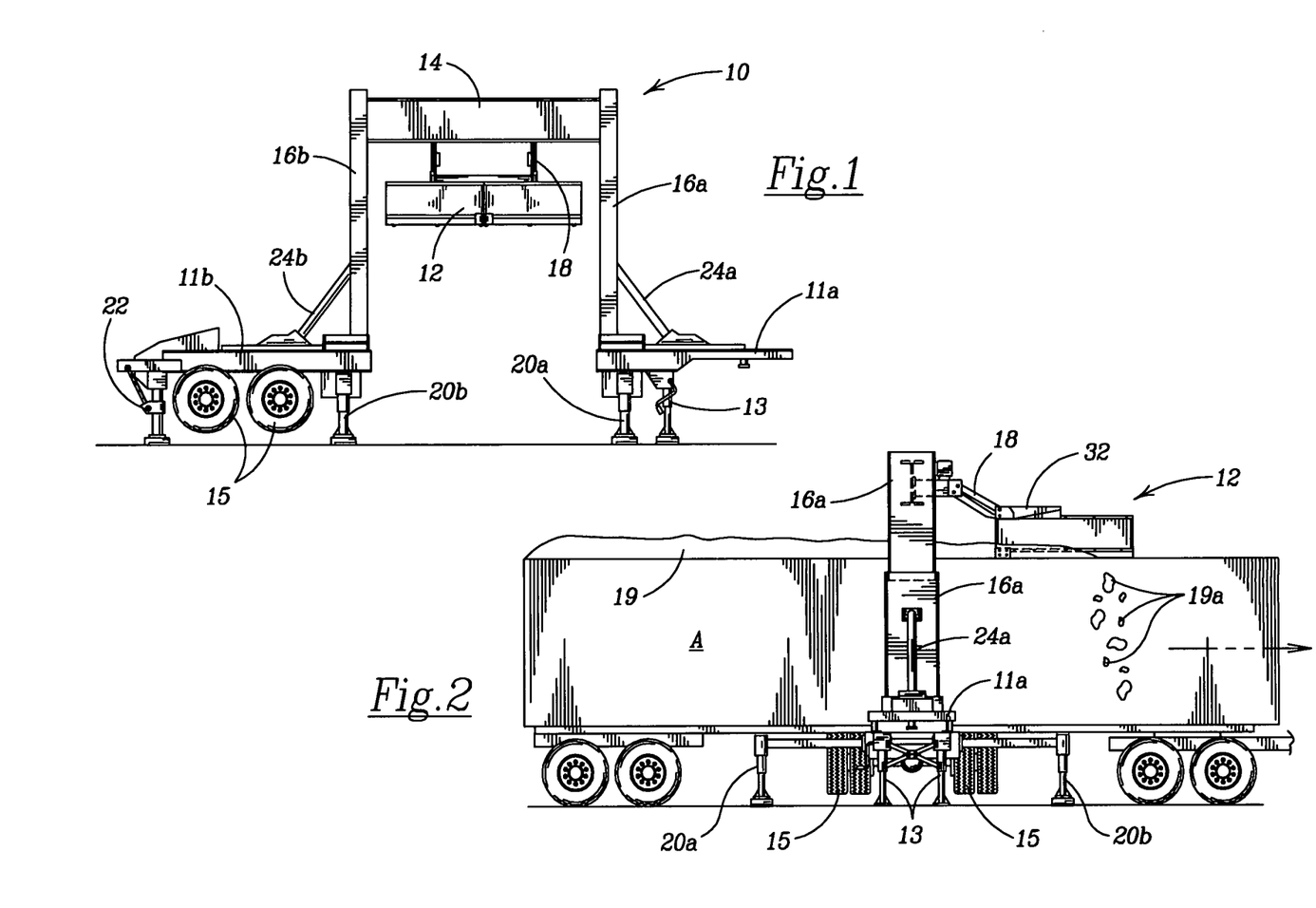
FIG. 1 is an operationally front view of the portable truck trailer rooftop snow and ice removal apparatus of the present invention mounted onto a two-part mobile trailer platform.
FIG. 2 is a side view of the truck trailer rooftop snow and ice removal apparatus of the present invention showing the scraper blade assembly deployed atop a trailer being pulled through the apparatus and snow and ice being removed from the trailer rooftop.

Referring now to the drawings in detail, where like numerals refer to like parts or elements, there is shown in FIG. 1 the portable truck trailer rooftop snow and ice removal apparatus 10 of the present invention mounted to a two-part mobile trailer platform 11. The flatbed trailer platform 11 is separated into front and rear sections 11a, 11b onto each of which is mounted one of two towers 16a, 16b that support a connecting bridge 14 between them. The mobile trailer platform sections 11a, 11b can be the front and rear portions of a flatbed trailer with trailer dolly supports 13 under the front section 11a and dual wheeled axles 15 at the rear of the rear section 11b. The trailer dolly assembly 13 provides initial support and stability for the portable snow and ice removal apparatus 10 as do the dual wheeled axles 15 in the rear provide support and stability for both mobility and initial setup of the apparatus 10.

The portable snow and ice removal apparatus 10 includes a vertically adjustable plow-like blade assembly 12 for traversing along the tops of land mobile vehicles to remove deposits of snow and ice. The blade assembly 12 is positioned at the approximate midpoint of the bridge 14 between the top portions of the two towers 16a, 16b and is adjustable for vertical movement by a hydraulic lift means 18 for close height adjustment to a point proximate the roof of a vehicle to be cleaned.

The apparatus 10 has a plurality of stabilizing jacks 20, 22 to support the weight of the vehicle and maintain the position of the apparatus 10 while in use. On either side of the open pathway between the towers 16a, 16b, and adjacent each of the towers 16a, 16b, two sets of stabilizer jacks 20a, 20b are positioned such that these stabilizer jacks 20a, 20b can be utilized as outriggers extending forward and backward from the trailer platform 11 to maintain the towers 16a, 16b in a substantially vertical orientation during use of the portable snow and ice removal apparatus 10. Rear stabilizer jacks 22 are positioned at either side of the rear of the rear section of the trailer platform 11 b to maintain the entire trailer platform 11 substantially level to prevent wracking of the tower 16 during use.

An additional tower stabilizer to maintain perpendicularity of the towers 16a, 16b with their respective trailer sections 11a, 11b are stabilizer braces 24a, 24b which are angularly positioned between the trailer bed and each of the vertical towers 16a, 16b. The vertical stabilization braces 24a, 24b are attached to the trailer bed by a suitable base and positioned for attachment to the towers 16a, 16b below the mid-portion of each tower 16a, 16b to support and maintain each tower in substantial perpendicularity to the respective trailer bed. The attachment of the stabilizer braces 24a, 24b may be by welding or bolting, or by any other suitable means that prevent any shift in the perpendicular relationship of the towers 16a, 16b.

Referring now to FIG. 2, there is shown a trailer A being towed through the apparatus 10 to remove snow and ice from the trailer rooftop with the direction of motion shown by the directional arrow. The blade assembly 12 is extended and maintained in a downward forced position by the hydraulic lift means 18 that is mounted to and extends rearwardly from the center of the bridge 14. The hydraulic lift means 18 is connected to the top of the blade assembly 12 spanning across the dual outwardly angled pusher blades of the blade assembly 12 by vertical positioning platform 32. In this manner, the snow and ice 19 lying atop the trailer A is pushed outward and off the top surface of the trailer A as depicted by the falling snow and ice 19a.

Figure 3:
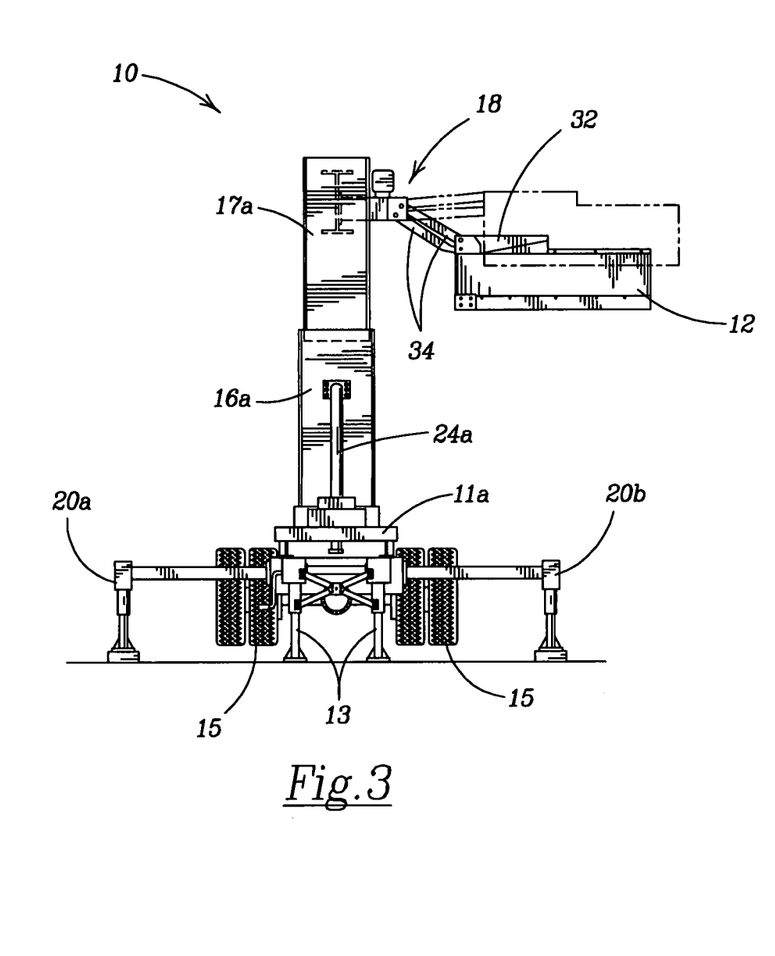
FIG. 3 is another side view of the truck trailer rooftop snow and ice removal apparatus of the present invention showing the vertical adjustability of the rooftop scraper blade assembly of the apparatus to accommodate vehicles of differing heights.
Figure 4:
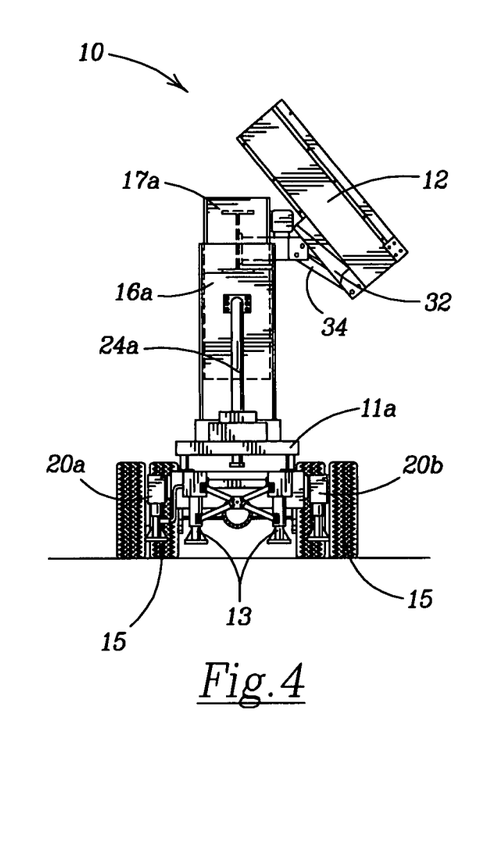
FIG. 4 is another side view of the portable truck trailer rooftop snow and ice removal apparatus of the present invention showing the tower lowered for transport with the rooftop scraper blade assembly lowered for stowage.

FIG. 3 and FIG. 4 show the truck trailer rooftop snow and ice removal apparatus 10 of the present invention in a deployed and a stowed position, respectively. FIG. 3 shows the stabilizer jacks 20a, 20b deployed forward and rearward of the tower 16a with the trailer dolly assembly 13 also deployed to lift and stabilize the trailer bed. The tower 16a is shown with its upper portion 17a extended increasing the height of the tower to accommodate vehicles having heights approaching and exceeding 14 feet. Each of the towers 16a, 16b is extendible either by pulley and gearing to crank the extendible section upwards and downwards, or alternatively by hydraulic piston means to do the same. The towers 16a, 16b are simultaneously raised and lowered as the bridge 14 rigidly links the tops of the towers 16a, 16b. When the portable snow and ice removal apparatus 10 is fully deployed as described above, the operator's attention is directed to the vertical adjustability of the rooftop blade assembly 12 of the apparatus 10. The blade assembly 12 is mounted to the vertical positioning platform 32 which is moveable upward and downward in accordance with the position of the control arms 34 of the hydraulic lift means 18. The hydraulic lifts means 18 is responsive to operator controls that move the vertical positioning platform 32 to adjust the height of the blade assembly 12. The hydraulic lift means 18 maintains the blade assembly 12 in a forced downward direction against the rooftop of the vehicle which enables the blade assembly 12 to clear all snow and ice from the rooftop without lifting up. The hydraulic lifts means 18 controls the blade assembly 12 so that it follows the roofline of the vehicle and remains in substantial contact with the roof of the vehicle being cleaned of snow and ice.

FIG. 4 shows the portable snow and ice removal apparatus 10 with the tower 16a lowered for transport, prior to stowage of the rooftop plow apparatus 10. As described above, the extendible section 17a of the tower 16a is raised and lowered by use of a crank or manual winch, or by hydraulic piston arrangement. The winch and pulley system, or the hydraulic piston, work in combination with respective locking pins (not shown) in each tower 16a, 16b to lock and maintain the towers of apparatus 10 in the extended or lowered positions. Either of the systems to raise and lower the towers may alternatively be electrically operated.

The blade assembly. 12 in FIG. 4 is shown in its stowed position. The hydraulic arms 34 bring the positioning plate 32 in close to the bridge 14 spanning the towers 16a, 16b such that the blade assembly is retracted against the bridge 14. With the tower extension 17a lowered into the tower base 16a, as shown in FIG. 4, as well as the companion tower extension lowered into tower 16b, and the stabilizer jacks 20a, 20b and 22 retracted and stowed, the portable snow and ice vehicle rooftop clearing apparatus 10 is ready for relocation. Absent the lowering of the tower section 17a, 17b, the overall height of the apparatus 10 would be too great for easy movement over roads as it would be unable to pass under bridges having lower clearances, e.g., 12 feet or less.

Figure 5:
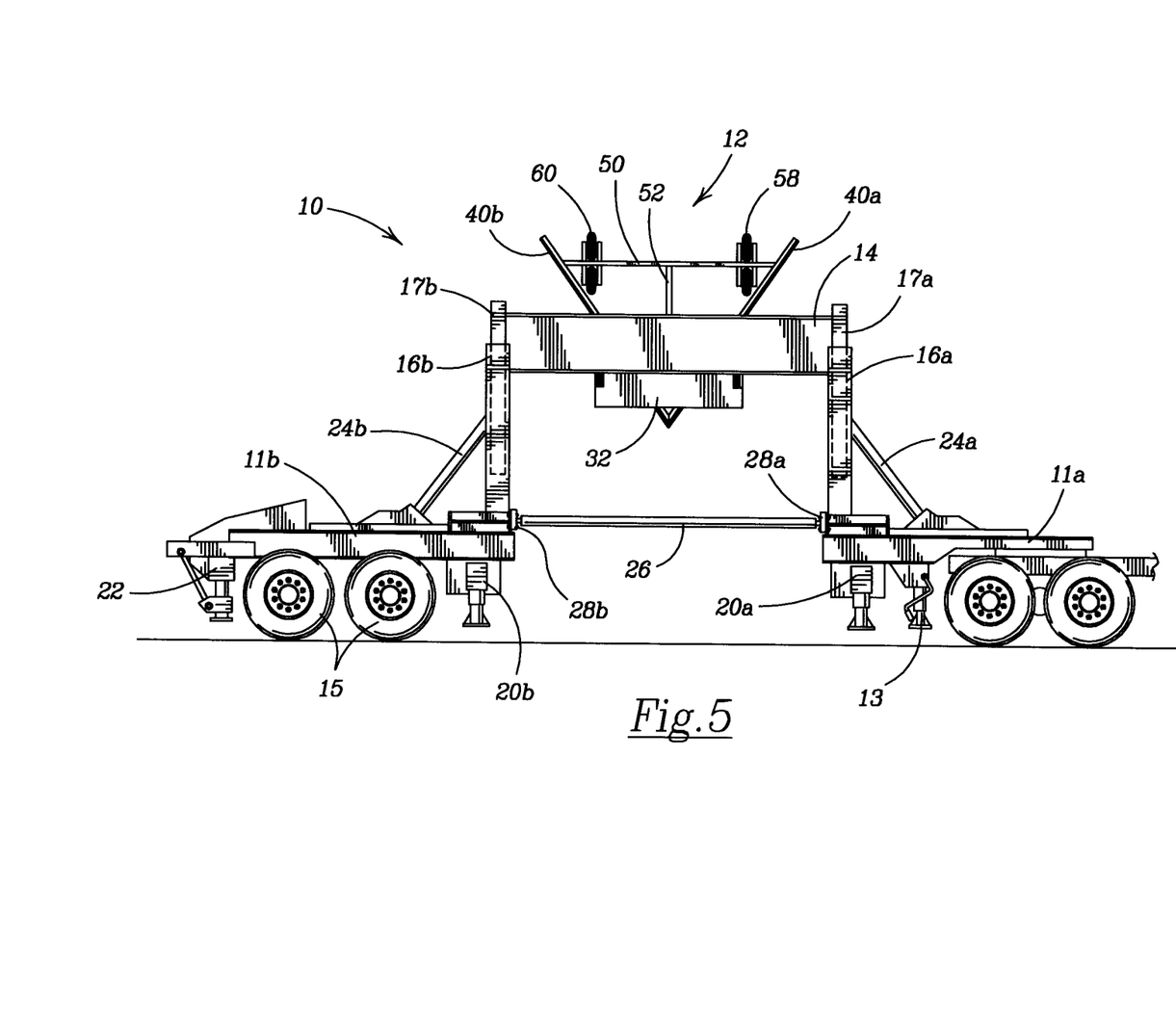
FIG. 5 is a front view of the portable truck trailer rooftop snow and ice removal apparatus of the present invention showing the towers lowered for transport with the rooftop scraper blade assembly also lowered for stowage and transport.

Shown in FIG. 5 is portable snow and ice removal apparatus 10 with the extendible portions 17a, 17b of towers 16a, 16b lowered for transport with the rooftop blade assembly 12 also stowed for transport. In the stowed condition all of the stabilizer jacks 20a, 20b and 22 are shown retracted and locked in travel position. Also the trailer dolly assembly 13 is retracted as the trailer 11 is connected to a tractor for towing. In addition, in order to maintain the alignment of the front and rear trailer sections 11a, 11b and to reduce structural stress on the towers 16a, 16b and the connecting bridge 14 when being towed, a trailer section locking bar 26 is positioned between the front trailer section 11a and the rear trailer section 11b to retain the trailer bed spacing between the two halves of the trailer 11 during towing. The trailer section locking bar 26 can be attached to the trailer sections in either of two preferred methods. The trailer section locking bar 26 can be attached to receivers 28a, 28b located on the rear of the front trailer section 11a and the front of rear trailer section 11b, respectively. The ends of the trailer section locking bar 26 are held in place in the receivers 28a, 28b with locking pins (not shown) extending through the trailer section locking bar 26. The trailer section locking bar 26 can also be fitted with plates at each end to fit into slotted receivers 28a, 28b on the respective facings ends of the trailer sections 11a, 11b and secured into place with bolts or similar temporary securing devices. The trailer section locking bar 26 is removed for use of the portable snow and ice vehicle rooftop clearing apparatus 10. The trailer section locking bar 26, once the locking pins or other securing device shave been removed, may be lifted upward out of the receivers 28a, 28b, and stowed by winching the locking bar 26 upward against the underside of the bridge 14. Alternatively, the trailer section locking bar 26 may be stowed on either trailer section 11a, 11b until required for structurally linking the two trailer sections 11a, 11b for relocation of the portable snow and ice vehicle rooftop clearing apparatus 10.

Figure 6:
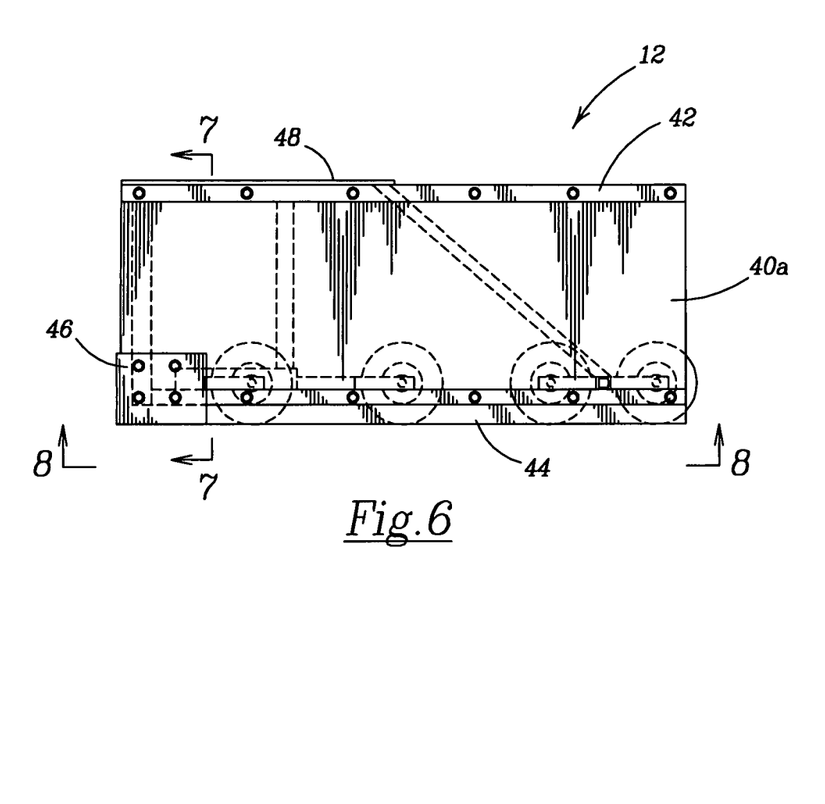
FIG. 6 is a side view of the trailer rooftop scraper assembly showing (in phantom) the arrangement of the support and guide wheels and reinforcing structure of the assembly.
Figure 7:
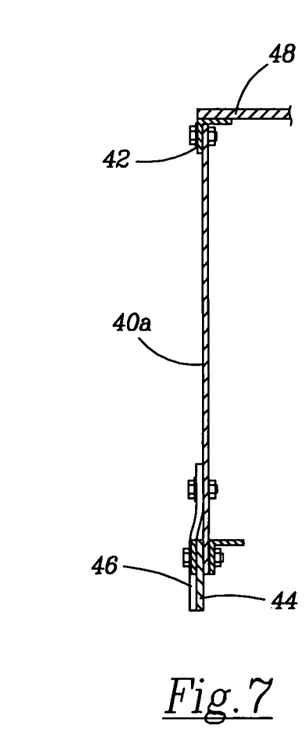
FIG. 7 is a sectional view taken along Line 7-7 of FIG. 6 showing the front or leading edge of the scraper blade of the present invention.

FIG. 6 shows a side view of the trailer rooftop blade assembly 12 depicting a number of structural elements, some in phantom, that provide the structural support and stability of the blade assembly 12. Looking at the right side of the blade assembly 12 a right pusher blade 40a is attached to a structural frame with a reinforcing upper flange 42 attached at the top of the pusher blade 40a. The pusher blade 40a has an overlapping rubber member 44 located along the lower outer edge of the pusher blade 40a and extending along the lower outer edge of the mirror-image pusher blade 40b (See FIG. 8). The overlapping rubber member 44 mounted on the lower edge of plow blade assembly 12 is sufficiently rigid in its rolled position to remove the snow and ice but without any rough or sharp edges that could be damaging the rooftop of a vehicle. Both the reinforcing flange 42 and the overlapping member 44 are bolted along their respective lengths to the blade assembly 12. At the lower front vertex of the pusher blade section 40a, 40b is a front blade reinforcer 46 for adding to the stability and structural integrity of the blade assembly 12. A sectional view of the right side pusher blade 40a is shown in FIG. 7 depicting the vertically oriented pusher blade 40a, the reinforcing flange 42 at the top of the blade 40a, and the front reinforcer 46 and overlapping member 44 at the bottom of the blade 40a. Spanning the top front portion of the blade assembly 12 is a mounting plate 48 for mounting to the positioning plate 32 of the hydraulic lift means 18.

Figure 8:
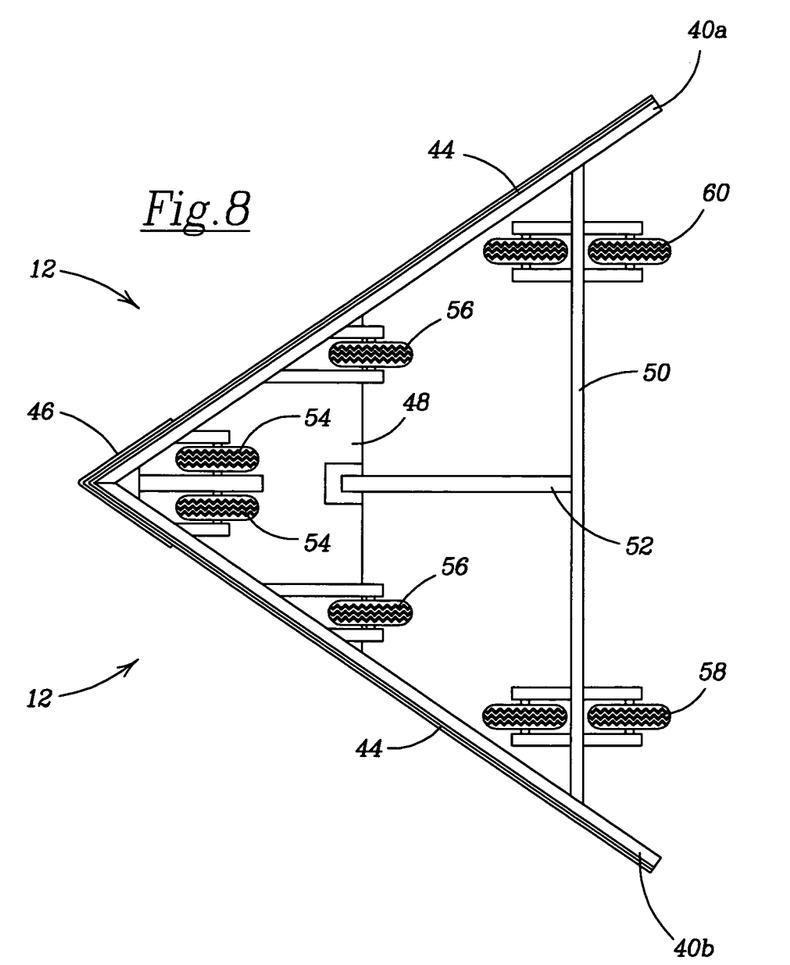
FIG. 8 is a sectional view taken along Line 8-8 of FIG. 6 showing the structural arrangement of the elements of the scraper blade assembly of the present invention from a bottom view looking upwards.

FIG. 8 is a bottom view of the blade assembly 12 of the present invention 10. The structural frame maintains a wedge or a V-shape pusher blade angle for blade assembly 12. The blade assembly 12 is angled symmetrically from the centerline of the point of application in the range between 30° and 45° outward from the centerline of the V-shape pusher blades 40a, 40b with each blade segment having a sufficient length to extend over the sidewall of the vehicle. The blade portions 40a, 40b are maintained at their angular orientation by a structural frame consisting of several interconnected members that may be described as follows. Across the top front of the wedge shaped pusher blade assembly 12 is a mounting plate 48 attached by bolting or welding to the right and left side pusher blades 40a, 40b. At the rear of the wedge shaped pusher blade assembly 12, across the open space between the blade segment 40a, 40b, there is a structural member 50 welded or bolted to the inner sides of the pusher blade segments in the lower portions thereof spanning the open space and maintaining the spacing of the rear edges of the pusher blade segments 40a, 40b. Connecting the structural member 50 and the mounting plate 48 is the angled connecting strut 52 that maintains the vertical spatial integrity of the pusher blade segments.

Along the bottom of the pusher blade assembly 12 are arrayed a series of wheels that stabilize the blade assembly both front-to-back and side-to-side to allow the replaceable overlapping member 44 located along the bottom of the blade segments 40a, 40b continued close contact with the vehicle roof without damage by gouging or tearing. These guide wheels are located in three areas, the first being directly behind the vertex of the blade segments 40a, 40b. This first set of paired guide wheels 54 are mounted to a common axle that extends between paired struts extending rearward from symmetrical points on the inner sides of the respective blade segments 40a, 40b. As added support, another strut separates the paired wheels 54 and supports the axle that passes through the added central strut. A second set of wheels 56 are positioned approximately midway along the length of the blade segments 40a, 40b and mounted to each of the inner sides of the blade segments by paired struts on both sides of the wheels 56 through which individual axles extend. The final sets of paired guide wheels 58, 60 are mounted one behind the other at the respective ends of the structural member 50 connecting the rear edges of the pusher blade segments 40a, 40b. The wheel sets 58, 60 are mounted both to the front and the rear of the structural member 50 by paired struts with axles extending through the wheels 58, 60 mounted between the struts. The vehicle rooftop contact points of the guide wheels 54, 56, 58 and 60 are maintained at the same height as the bottom of the push blade segments 40a, 40b, with the overlapping member 44 being the lowest point in contact with the vehicle rooftop. This evenly spread dimensional height across the entire bottom of the pusher blade assembly 12 is to maintain the blade assembly 12 in an evenly spaced and parallel orientation to the vehicle roof top in order to protect the rooftop of the trailer, truck or bus from damage.

The reinforcing structure of the blade assembly 12 is composed of the structural support bars 50, 52, the mounting plate 48, and the guide wheels 54, 56, 58 and 60 provide a structural integrity for the blade assembly 12. This structure retains the wedge shaped angular arrangement of the elements and provides for the precise elevation for the pusher blade segments 40a, 40b to cooperate with the other structural components to scrape and push the snow and ice from the rooftop of the vehicle without gouging or tearing the rooftop.

The V-shaped blade assembly 12 throws the snow outward and downward while pushing along the length of the vehicle rooftop. (See FIG. 2) Blade assembly 12 is wider than the vehicle rooftop and extends outward of the sidewalls of the vehicle at the rear of the blade assembly to allow the snow and ice to be completely pushed off the rooftop and outward over both of the sides of the vehicle.

Additionally, the cooperative mounting of the mounting plate 48 on the blade assembly 12 with the vertical positioning platform 32 of the hydraulic lift means 18 creates a flat planar orientation between these two components at the forwardmost portion of the blade segments 40a, 40b to force plowed-up material outward, downward and away from the vehicle roof. The positioning platform 32 located at the end of the control arms 34 of the hydraulic lift means 18, which is operator controlled from below, assists in raising and lowering the blade assembly 12. The guide wheels 54, 56, 58 and 60 add stability to the blade assembly 12 so that the blade segments 40a, 40b cannot move out of alignment with each other or with the roof surface of the vehicle and do not damage the top of the vehicle. Further, the blade assembly 12 has the ability to bounce on the roof top with the assistance of the hydraulic lift means 18 with the cushioning effect of the guide wheels 54, 56, 58 and 60 in order to break up compacted snow or ice for easier removal.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A relocatable vehicle roof top snow and ice removal apparatus comprising:
    a converted flatbed trailer base having front and rear sections and a space between them to accommodate the passage of a vehicle;
    a pair of towers each having a top and bottom portion, the bottom portions of each of said towers mounted to one of said front and rear trailer sections, and said towers being joined together at their respective top portions by a bridge spanning the space to accommodate the vehicle passage;
    a scraper blade assembly mounted at the midpoint of the bridge and being operatively controlled for raising and lowering said blade assembly to engage and remain engaged with the roof surface of the vehicle to be cleaned of snow and ice by maintaining downward force against the roof of the vehicle, said scraper blade assembly comprising a V-shaped pusher blade having right and left portions extending from the apex rearward a distance sufficient to extend beyond the sides of the vehicle to be cleaned of snow and ice, said V-shaped pusher blade attached to a mounting plate connected to a vertical position controller for said pusher blade, a first structural frame member spanning and maintaining a predetermined distance between the rear of the right and left blade portions and a second structural frame member extending from the midpoint of the first structural frame member upward and forward connecting to said mounting plate, a reinforcing member located across the outer surface of the apex of the right and left blade portions and extending rearward along the blade portions a short distance, and a vehicle roof contact scraping member attached along the bottom of both right and left blade portions; and,
    a self-contained stabilization means for retaining the scraper blade assembly in parallel relationship to the surface of the vehicle roof in order to prevent damage to the vehicle roof, said stabilization means comprises the V-shaped pusher blade having right and left portions and a series of guide wheels, said guide wheels positioned behind the apex of the V-shaped pusher blade, midway between the apex and rear along the interior of each of the right and left blade portions, and at the rear inward facing side of each of the right and left blade portions to support the pusher blade in a parallel relationship to the vehicle roof, said guide wheels being vertically positioned on the scraper blade assembly to extend only the same dimensional distance downward as the lowest extension of the right and left blade portions.

2. The relocatable vehicle roof top snow and ice removal apparatus of claim 1 further comprising a plurality of stabilizing jacks located along the periphery of the front and rear trailer sections at opposite sides of the towers and at the rear of the rear trailer section to maintain a perpendicular relationship of the apparatus to the roof top of the vehicle.

3. The relocatable vehicle roof top snow and ice removal apparatus of claim 1 further comprising stabilizer bracing members for maintaining a perpendicular relationship of said towers to the trailer sections beds extending between the flat bed of each of the front and rear sections of the trailer to the near side of the bottom portion of the adjacent tower.

4. The relocatable vehicle roof top snow and ice removal apparatus of claim 1 further comprising a trailer section locking bar connecting said front and rear trailer sections for maintaining the spacing between the trailer sections the same as between the towers for use in relocating of the apparatus.

5. The relocatable vehicle roof top snow and ice removal apparatus of claim 1 further comprising a hydraulic controller for raising and lowering said blade assembly in the vertical direction for close height adjustment to a point proximate the roof of a vehicle to be cleaned of snow and ice.

* * * * *